United States Patent
Aoki

(10) Patent No.: US 8,247,502 B2
(45) Date of Patent: Aug. 21, 2012

(54) ADDITION REACTION-CURABLE SILICONE PRESSURE-SENSITIVE ADHESIVE COMPOSITION AND PRESSURE-SENSITIVE ADHESIVE TAPE

(75) Inventor: Shunji Aoki, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 175 days.

(21) Appl. No.: 12/817,486

(22) Filed: Jun. 17, 2010

(65) Prior Publication Data

US 2010/0323145 A1    Dec. 23, 2010

(30) Foreign Application Priority Data

Jun. 18, 2009 (JP) .................................. 2009-145207

(51) Int. Cl.
*C08L 83/04* (2006.01)

(52) U.S. Cl. .......... 525/478; 525/477; 525/479; 528/15; 528/31; 528/32; 428/447

(58) Field of Classification Search .................. None
See application file for complete search history.

(56) References Cited

U.S. PATENT DOCUMENTS

| | | | | |
|---|---|---|---|---|
| 5,254,644 | A * | 10/1993 | Kobori et al. ............ | 525/478 |
| 5,415,912 | A * | 5/1995 | Ushizaka et al. ......... | 428/41.4 |
| 5,696,209 | A * | 12/1997 | King et al. .............. | 525/478 |
| 6,387,487 | B1 * | 5/2002 | Greenberg et al. ...... | 428/355 R |
| 2010/0168313 | A1 * | 7/2010 | Mizuno et al. .......... | 524/500 |

FOREIGN PATENT DOCUMENTS

| | | |
|---|---|---|
| EP | 1 295 927 A1 | 3/2003 |
| JP | 7-11228 | 1/1995 |
| JP | 2008-24777 | 2/2008 |
| WO | WO 2008/081913 A1 | 7/2008 |

OTHER PUBLICATIONS

Extended European Search Report issued Oct. 20, 2010, in European Patent Application No. 10165472.1.

* cited by examiner

*Primary Examiner* — Marc Zimmer
(74) *Attorney, Agent, or Firm* — Oblon, Spivak, McClelland, Maier & Neustadt, L.L.P.

(57) ABSTRACT

Provided is an addition reaction-curable silicone pressure-sensitive adhesive composition, including: (A) a specific diorganopolysiloxane consisting of (A1) a linear diorganopolysiloxane having two or more alkenyl groups, and (A2) a linear diorganopolysiloxane having SiOH groups at the terminals and containing no alkenyl groups, (B) a specific organopolysiloxane containing M units, Q units and SiOH group-containing siloxane units, (C) an organohydrogenpolysiloxane containing three or more SiH groups, (D) an addition reaction retarder, (E) a platinum group metal-based catalyst, and (F) a specific organopolysiloxane containing T units and D units. A cured product layer formed from a cured product of this composition can be peeled from a release film with minimal peeling force, and exhibits excellent adhesion to silicone rubbers. The composition is ideal for use within a pressure-sensitive adhesive tape including a substrate and an aforementioned cured product layer laminated to at least one surface of the substrate.

9 Claims, No Drawings

ADDITION REACTION-CURABLE SILICONE PRESSURE-SENSITIVE ADHESIVE COMPOSITION AND PRESSURE-SENSITIVE ADHESIVE TAPE

BACKGROUND OF THE INVENTION

1. Field of the Invention

The present invention relates to an addition reaction-curable pressure-sensitive adhesive composition which forms a cured product layer that can be peeled from a release film with minimal peeling force and exhibits excellent adhesion even to silicone rubbers. The invention also relates to a pressure-sensitive adhesive tape that uses the composition.

2. Description of the Prior Art

Pressure-sensitive adhesive tapes and pressure-sensitive adhesive labels that use a silicone pressure-sensitive adhesive comprise a silicone pressure-sensitive adhesive layer that exhibits excellent levels of heat resistance, cold resistance, weather resistance, electrical insulation and chemical resistance, and they are therefore used under severe conditions, such as very high or very low temperatures, where organic resin-based pressure-sensitive adhesives such as acrylic pressure-sensitive adhesives or rubber-based pressure-sensitive adhesives would suffer deformation or degradation.

Further, silicone pressure-sensitive adhesives exhibit excellent adhesion to all manner of adherends. Silicone pressure-sensitive adhesives also exhibit adhesion to a variety of surfaces that are difficult to bond using organic resin-based pressure-sensitive adhesives such as acrylic pressure-sensitive adhesives or rubber-based pressure-sensitive adhesives, the surfaces including silicone rubbers, silicone release papers, surfaces that have been coated with a release agent, water repellent agent, antifouling agent, paint or coating agent or the like that contains silicone, fluororesins, and surfaces that include a fluororesin component. Accordingly, silicone pressure-sensitive adhesives are ideal for use within pressure-sensitive adhesive tapes used when bonding or fixing a silicone rubber member to another member. However, in recent years there have been growing demands for pressure-sensitive adhesives that are capable of bonding together members of greater mass and capable of producing a bonded interface that is able to withstand greater impact than that achievable using conventional pressure-sensitive adhesives, and therefore there is a need to further improve the adhesive strength of silicone pressure-sensitive adhesives to silicone rubbers.

To provide a specific example, a silicone pressure-sensitive adhesive is used in the pressure-sensitive adhesive tape used for bonding the key tops to a silicone rubber key pad, and in order to ensure superior durability to repeated keystrokes, the pressure-sensitive adhesive tape must be resistant to peeling under all manner of environments from low temperature to high temperature.

When a pressure-sensitive adhesive tape that uses a conventional silicone pressure-sensitive adhesive is employed for the type of application described above, if the shape of the member being bonded is such that a satisfactory bonding surface area cannot be ensured, then detachment of the member may occur as a result of peeling of the pressure-sensitive adhesive tape.

On the other hand, silicone pressure-sensitive adhesive compositions comprising an organosilicon compound having B—O—Si bonds are already known (see Patent Document 1). However, although Patent Document 1 states that these compositions provide improved adhesive strength to silicone rubbers, these compositions still suffer from inadequate adhesive strength to silicone rubbers, and the compositions may also suffer from reduced adhesive strength to adherends other than silicone rubbers.

Further, silicone pressure-sensitive adhesive compositions that use a mixture of a diorganopolysiloxane containing alkenyl groups and a polyorganosiloxane containing no alkenyl groups are also known (see Patent Document 2), and Patent Document 2 states that these compositions provide improved adhesive strength to silicone rubbers, but the adhesive strength of these compositions to silicone rubbers also still tends to be inadequate.

In some cases, a release film may be bonded to the silicone pressure-sensitive adhesive surface of a pressure-sensitive adhesive tape prior to use of the tape in order to protect the silicone pressure-sensitive adhesive surface. A release film coated with a silicone-based release agent containing a fluorine-containing substituent is typically used for protecting the silicone pressure-sensitive adhesive surface. This release film is peeled away and removed from the silicone pressure-sensitive adhesive surface when the pressure-sensitive adhesive tape is used, and therefore it is desirable that the release film is able to be peeled off with minimal force. In the case of a pressure-sensitive adhesive tape that uses an aforementioned silicone pressure-sensitive adhesive composition comprising an organosilicon compound having B—O—Si bonds (Patent Document 1), peeling of the release film tends to require considerable force.

[Patent Document 1] JP 7-11228 A
[Patent Document 2] JP 2008-24777 A

SUMMARY OF THE INVENTION

The present invention aims to improve the circumstances described above, and has an object of providing an addition reaction-curable pressure-sensitive adhesive composition which forms a cured product layer that can be peeled from a release film with minimal peeling force and exhibits excellent adhesion to silicone rubbers. Another object of the present invention is to provide a pressure-sensitive adhesive tape that uses the composition.

As a result of intensive investigation aimed at achieving the above objects, the inventors of the present invention discovered that by curing an addition reaction-curable silicone pressure-sensitive adhesive composition comprising a specific organopolysiloxane, a cured product layer was obtained that could be peeled from a release film with minimal peeling force and yet exhibited excellent adhesion to silicone rubbers, and they were therefore able to complete the present invention.

In other words, a first aspect of the present invention provides an addition reaction-curable silicone pressure-sensitive adhesive composition, comprising:

(A) a diorganopolysiloxane consisting of:
  (A1) a linear diorganopolysiloxane having two or more alkenyl groups within each molecule, and
  (A2) a linear diorganopolysiloxane having SiOH groups at the terminals and containing no alkenyl groups, wherein the mass ratio of (A1)/(A2) is within a range from 100/0 to 10/90,
  in an amount of 20 to 80 parts by mass, (B) an organopolysiloxane comprising $R^3{}_3SiO_{0.5}$ units (wherein $R^3$ represents a monovalent hydrocarbon group of 1 to 10 carbon atoms), $SiO_2$ units, and siloxane units having a hydroxyl group bonded to a silicon atom, wherein
  the molar ratio of $R^3{}_3SiO_{0.5}$ units/$SiO_2$ units is within a range from 0.5 to 0.9, and the hydroxyl group content is within a range from 0.1 to 5.0% by mass,
in an amount of 80 to 20 parts by mass (provided that the combined total of component (A) and component (B) is 100 parts by mass), (C) an organohydrogenpolysiloxane comprising three or more SiH groups within each molecule, in an amount such that the molar ratio of SiH groups within component (C) relative to alkenyl groups within the composition is within a range from 0.5 to 20, (D) an addition reaction retarder, in an amount within a range from 0 to 8.0 parts by mass per 100 parts by mass of the combination of component (A) and component (B), (E) a platinum group metal-based catalyst, in an amount sufficient to provide a mass of the platinum group metal equivalent to 1 to 5,000 ppm relative to the combined mass of component (A) and component (B), and (F) an organopolysiloxane comprising $R^3_1SiO_{1.5}$ units and $R^3_2SiO_1$ units (wherein $R^3$ is as defined above), wherein the molar ratio of $R^3_1SiO_{1.5}$ units/$R^3_2SiO_1$ units is within a range from 100/0 to 30/70,
in an amount within a range from 1 to 30 parts by mass per 100 parts by mass of the combination of component (A) and component (B).

A second aspect of the present invention provides a pressure-sensitive adhesive tape comprising a substrate, and a cured product layer consisting of a cured product of the above composition laminated to at least one surface of the substrate (hereafter, a cured product layer consisting of a cured product of an addition reaction-curable silicone pressure-sensitive adhesive composition may also be referred to as a "silicone pressure-sensitive adhesive layer").

Upon curing, the silicone pressure-sensitive adhesive composition of the present invention forms a cured product layer that exhibits powerful adhesion to silicone rubbers. A pressure-sensitive adhesive tape comprising such a cured product layer is able to powerfully bond or fix silicone material adherends, and particularly silicone rubbers. On the other hand, the pressure-sensitive adhesive tape is still able to be peeled from a release film with minimal peeling force. Accordingly, the silicone pressure-sensitive adhesive composition of the present invention can be used favorably for bonding or affixing silicone materials, and particularly silicone rubbers.

DETAILED DESCRIPTION OF THE PREFERRED EMBODIMENTS

Detailed descriptions of each of the components of the silicone pressure-sensitive adhesive composition of the present invention, as well as descriptions of a method of producing the composition and uses for the composition, are presented below.

<Component (A)>

Component (A) is a diorganopolysiloxane consisting of:
(A1) a linear diorganopolysiloxane having two or more alkenyl groups within each molecule, and
(A2) a linear diorganopolysiloxane having SiOH groups at the terminals and having no alkenyl groups, wherein
the mass ratio of (A1)/(A2) is within a range from 100/0 to 10/90. This mass ratio of (A1)/(A2) is preferably within a range from 90/10 to 10/90, and more preferably from 50/50 to 20/80.

The diorganopolysiloxane of component (A) may exist in either an oily state or a crude rubber state. In the case of an oily state, the viscosity of the component (A) at 25° C. is preferably within a range from 5,000 to 1,000,000 mPa·s. In the case of a crude rubber state, the viscosity at 25° C. of a solution prepared by dissolving the component (A) in toluene to form a solution with a concentration of 30% by mass is preferably within a range from 1,000 to 100,000 mPa·s. Of these, a crude rubber component (A) for which the viscosity at 25° C. of this 30% by mass toluene solution is within a range from 3,000 to 60,000 mPa·s is particularly desirable. Provided that either the viscosity at 25° C. of an oily state component (A) is not more than 1,000,000 mPa·s, or the viscosity at 25° C. of a 30% by mass toluene solution of a crude rubber component (A) is not more than 100,000 mPa·s, the resulting silicone pressure-sensitive adhesive composition is prevented from becoming overly viscous, which facilitates mixing of the composition during production. In contrast, provided that either the viscosity at 25° C. of an oily state component (A) is at least 5,000 mPa·s, or the viscosity at 25° C. of a 30% by mass toluene solution of a crude rubber component (A) is at least 1,000 mPa·s, a more favorable level of tack can be achieved for the obtained silicone pressure-sensitive adhesive composition.

In this description, viscosity values refer to values measured at 25° C. using a rotational viscometer.

The component (A1) is a linear diorganopolysiloxane having two or more alkenyl groups within each molecule. Examples of the component (A 1) include linear diorganopolysiloxanes represented by formulas (1-1) and (1-2) shown below.

$$X_aR^1_{3-a}SiO—[XR^1SiO]_b—[R^1_2SiO]_c—SiX_aR^1_{3-a} \quad (1-1)$$

$$(HO)R^1_2SiO—[XR^1SiO]_{b+2}—[R^1_2SiO]_c—Si(OH)R^1_2 \quad (1-2)$$

In each of the above formulas, $R^1$ represents identical or different monovalent hydrocarbon groups of 1 to 10 carbon atoms that contain no aliphatic unsaturated bonds, X represents identical or different alkenyl groups of 2 to 10 carbon atoms, a represents 0, 1 or 3, b represents an integer of 0 or greater, and c represents an integer of 0 or greater, provided that $2a+b \geq 2$ and $500 \leq b+c \leq 20,000$.

In formulas (1-1) and (1-2), examples of $R^1$ include alkyl groups such as a methyl group, ethyl group, propyl group or butyl group, cycloalkyl groups such as a cyclohexyl group, and aryl groups such as a phenyl group or tolyl group, and of these, a methyl group or phenyl group is preferred, and a methyl group is particularly desirable. In those cases where the $R^1$ groups include phenyl groups, the phenyl group content is preferably within a range from 0 to 30 mol %, and more preferably more than 0 mol % but not more than 30 mol %, of all the organic groups within the diorganopolysiloxane represented by formula (1-1) or (1-2). If this phenyl group content exceeds 30 mol %, then the adhesive strength of the resulting silicone pressure-sensitive adhesive layer to silicone rubbers may deteriorate. Examples of X include alkenyl groups such as a vinyl group, allyl group or hexenyl group, and of these, a vinyl group or hexenyl group is preferred, and a vinyl group is particularly desirable.

Of all of the siloxane units within the component (A1), siloxane units having an alkenyl group preferably represent 0.03 to 1 mol %, and more preferably 0.05 to 0.30 mol %. Provided this amount is within the range from 0.03 to 1 mol %, the curability of the resulting pressure-sensitive adhesive composition and the adhesive strength of the obtained silicone pressure-sensitive adhesive layer are more likely to be favorable.

The component (A1) may be either a single compound or a combination of two or more compounds.

The component (A2) is a linear diorganopolysiloxane having SiOH groups at the terminals and containing no alkenyl groups. Examples of the component (A2) include linear diorganopolysiloxanes represented by formula (2) shown below.

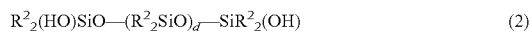

$$R^2{}_2(HO)SiO\text{---}(R^2{}_2SiO)_d\text{---}SiR^2{}_2(OH) \tag{2}$$

In this formula, $R^2$ represents identical or different monovalent hydrocarbon groups of 1 to 10 carbon atoms that contain no aliphatic unsaturated bonds, and d represents an integer that satisfies $500 \leq d \leq 20,000$.

Examples of $R^2$ include alkyl groups such as a methyl group, ethyl group, propyl group or butyl group, cycloalkyl groups such as a cyclohexyl group, and aryl groups such as a phenyl group or tolyl group, and of these, a methyl group or phenyl group is preferred, and a methyl group is particularly desirable. In those cases where the $R^2$ groups include phenyl groups, the phenyl group content is preferably within a range from 0 to 30 mol %, and more preferably more than 0 mol % but not more than 30 mol %, of all the organic groups within the diorganopolysiloxane represented by formula (2). If this phenyl group content exceeds 30 mol %, then the adhesive strength of the resulting silicone pressure-sensitive adhesive layer to silicone rubbers may deteriorate.

The component (A2) may be either a single compound or a combination of two or more compounds.

<Component (B)>

The component (B) is an organopolysiloxane comprising $R^3{}_3SiO_{0.5}$ units (wherein $R^3$ represents a monovalent hydrocarbon group of 1 to 10 carbon atoms), $SiO_2$ units, and siloxane units having a hydroxyl group bonded to a silicon atom, wherein the molar ratio of $R^3{}_3SiO_{0.5}$ units/$SiO_2$ units is within a range from 0.5 to 0.9, and preferably from 0.6 to 0.8, and the hydroxyl group content is within a range from 0.1 to 5.0% by mass. If the above molar ratio is less than 0.5, then at least one of the adhesive strength and the tack of the resulting silicone pressure-sensitive adhesive layer may deteriorate. If the molar ratio exceeds 0.9, then at least one of the adhesive strength and the holding power of the resulting silicone pressure-sensitive adhesive layer may deteriorate. Examples of $R^3$ include alkyl groups such as a methyl group, ethyl group, propyl group or butyl group, cycloalkyl groups such as a cyclohexyl group, aryl groups such as a phenyl group, and alkenyl groups such as a vinyl group, allyl group or hexenyl group, and of these, a methyl group is preferred.

The OH groups (namely, the hydroxyl groups) of the component (B) are incorporated in the form of siloxane units that contain a hydroxyl group bonded to a silicon atom, and the amount of these silanol group-containing units is sufficient to provide an OH group content within the component (B) of 0.1 to 5.0% by mass, and preferably 0.3 to 3.0% by mass. If the OH group content exceeds 5.0% by mass, then the tack of the resulting silicone pressure-sensitive adhesive layer tends to decrease, which is undesirable. Examples of the siloxane unit having a hydroxyl group bonded to a silicon atom include siloxane units that contain no other substituents besides the hydroxyl group(s). Specific examples include $(HO)SiO_{3/2}$ units, $(HO)_2SiO_{2/2}$ units and $(HO)_3SiO_{1/2}$ units, and the component (B) may include only one of these units, or a combination of two or more units. Further, the component (B) may also include one or both of $R^3SiO_{1.5}$ units and $R^3{}_2SiO$ units (wherein $R^3$ is as defined above) in amounts that do not impair the properties of the present invention. There are no particular restrictions on the combined amount of the $R^3{}_3SiO_{0.5}$ units and the $SiO_2$ units within the component (B), provided there are no adverse effects on the properties of the present invention, although this combined amount is preferably within a range from 80 to 100 mol %, and more preferably from 90 to 100 mol %, of all the siloxane units that constitute the component (B). The component (B) may be either a single compound or a combination of two or more compounds.

<Component (A) and Component (B)>

The blend ratio between the component (A) and the component (B), expressed as a mass ratio, is typically within a range from 20/80 to 80/20, and is preferably from 30/70 to 60/40, and more preferably from 30/70 to 50/50. If this blend ratio is lower than 20/80, then at least one of the adhesive strength and the holding power of the resulting silicone pressure-sensitive adhesive layer may deteriorate. In contrast, if the blend ratio exceeds 80/20, then at least one of the adhesive strength and the tack of the resulting silicone pressure-sensitive adhesive layer may deteriorate.

The components (A) and (B) may be used in the form of a mixture obtained simply by mixing the components (A1), (A2) and (B), or in the form of a condensation reaction product obtained by subjecting the components (A1), (A2) and (B) to a joint condensation reaction. Alternatively, the components (A) and (B) may be used in the form of a mixture obtained by mixing the component (A1) with a condensation reaction product of the component (A2) and the component (B). The component (A2) and the component (B) are preferably subjected to a condensation reaction in advance. Subjecting the components (A1), (A2) and (B) to a joint condensation reaction prior to use is even more preferable. The condensation reaction may be conducted by dissolving the mixture of the component (A) and the component (B) in a solvent such as toluene, subsequently reacting the mixture using an alkaline catalyst, either at room temperature or under heated reflux conditions, and then performing a neutralization if required.

Examples of the alkaline catalyst include metal hydroxides such as lithium hydroxide, sodium hydroxide, potassium hydroxide and calcium hydroxide, carbonates such as sodium carbonate and potassium carbonate, bicarbonates such as sodium bicarbonate and potassium bicarbonate, metal alkoxides such as sodium methoxide and potassium butoxide, organometallic compounds such as butyl lithium, potassium silanolate, and nitrogen compounds such as ammonia gas, ammonia water, methylamine, trimethylamine and triethylamine. Of these, ammonia gas or ammonia water is preferred. The temperature of the condensation reaction may be set within a range from 20 to 150° C., and is typically within a range from room temperature to the reflux temperature of the organic solvent. Although there are no particular restrictions on the reaction time, the reaction time is typically within a range from 0.5 to 20 hours, and is preferably from 1 to 10 hours.

Moreover, following completion of the reaction, if necessary, a neutralizing agent may be added to neutralize the alkaline catalyst. Examples of the neutralizing agent include acidic gases such as hydrogen chloride and carbon dioxide, organic acids such as acetic acid, octanoic acid and citric acid, and mineral acids such as hydrochloric acid, sulfuric acid and phosphoric acid.

<Component (C)>

The component (C) is an organohydrogenpolysiloxane comprising three or more SiH groups within each molecule. Specific examples of the component (C) include compounds represented by formula (3) shown below.

$$H_eR^4{}_{3-e}SiO\text{---}[HR^4SiO]_f\text{---}[R^4{}_2SiO]_g\text{---}SiH_eR^4{}_{3-e} \tag{3}$$

In this formula, $R^4$ represents identical or different monovalent hydrocarbon groups of 1 to 10 carbon atoms that contain no aliphatic unsaturated bonds, e represents 0 or 1, f represents an integer of 1 or greater, and g represents an integer of 0 or greater, provided that $2e+f \geq 3$ and $1 \leq f+g \leq 1,000$.

Examples of R⁴ include alkyl groups such as a methyl group, ethyl group, propyl group or butyl group, cycloalkyl groups such as a cyclohexyl group, and aryl groups such as a phenyl group or tolyl group. Of these, a methyl group or phenyl group is preferred, and a methyl group is particularly desirable. Moreover, organohydrogenpolysiloxanes comprising $R^4SiO_{3/2}$ units, $HSiO_{3/2}$ units and $SiO_{4/2}$ units, and containing three or more SiH groups within each molecule, may also be used as the component (C).

The viscosity of this organohydrogenpolysiloxane at 25° C. is preferably within a range from 1 to 1,000 mPa·s, and more preferably from 2 to 500 mPa·s. The component (C) may be a single organohydrogenpolysiloxane or a mixture of two or more different organohydrogenpolysiloxanes.

Specific examples of the organohydrogenpolysiloxane described above include the compounds listed below.

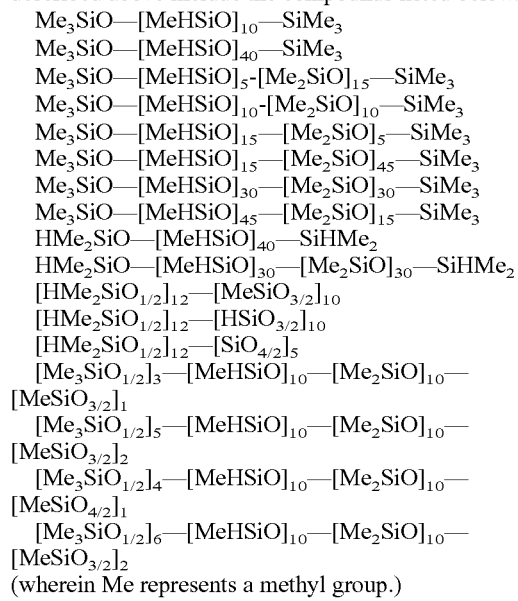

$Me_3SiO-[MeHSiO]_{10}-SiMe_3$
$Me_3SiO-[MeHSiO]_{40}-SiMe_3$
$Me_3SiO-[MeHSiO]_5-[Me_2SiO]_{15}-SiMe_3$
$Me_3SiO-[MeHSiO]_{10}-[Me_2SiO]_{10}-SiMe_3$
$Me_3SiO-[MeHSiO]_{15}-[Me_2SiO]_5-SiMe_3$
$Me_3SiO-[MeHSiO]_{15}-[Me_2SiO]_{45}-SiMe_3$
$Me_3SiO-[MeHSiO]_{30}-[Me_2SiO]_{30}-SiMe_3$
$Me_3SiO-[MeHSiO]_{45}-[Me_2SiO]_{15}-SiMe_3$
$HMe_2SiO-[MeHSiO]_{40}-SiHMe_2$
$HMe_2SiO-[MeHSiO]_{30}-[Me_2SiO]_{30}-SiHMe_2$
$[HMe_2SiO_{1/2}]_{12}-[MeSiO_{3/2}]_{10}$
$[HMe_2SiO_{1/2}]_{12}-[HSiO_{3/2}]_{10}$
$[HMe_2SiO_{1/2}]_{12}-[SiO_{4/2}]_5$
$[Me_3SiO_{1/2}]_3-[MeHSiO]_{10}-[Me_2SiO]_{10}-[MeSiO_{3/2}]_1$
$[Me_3SiO_{1/2}]_5-[MeHSiO]_{10}-[Me_2SiO]_{10}-[MeSiO_{3/2}]_2$
$[Me_3SiO_{1/2}]_4-[MeHSiO]_{10}-[Me_2SiO]_{10}-[MeSiO_{4/2}]_1$
$[Me_3SiO_{1/2}]_6-[MeHSiO]_{10}-[Me_2SiO]_{10}-[MeSiO_{3/2}]_2$ (wherein Me represents a methyl group.)

The blend amount of the component (C) is sufficient to produce a molar ratio of SiH groups within the component (C) relative to alkenyl groups within the composition of the present invention (namely, SiH groups/alkenyl groups) that is within a range from 0.5 to 20, and preferably from 0.6 to 15. If this molar ratio is less than 0.5, then the cross-linking density within the cured product of the silicone pressure-sensitive adhesive composition decreases, which may result in a decrease in the holding power of the obtained silicone pressure-sensitive adhesive layer. In contrast, if the molar ratio exceeds 20, then the adhesive strength and tack of the silicone pressure-sensitive adhesive layer may deteriorate, and the usable lifespan of a treatment liquid containing the pressure-sensitive adhesive composition may shorten. In the composition of the present invention, the component (A) contains alkenyl groups, and the components (B) and (F) may also optionally contain alkenyl groups. The molar ratio of alkenyl groups within the component (A) relative to the combined total of all alkenyl groups within the composition of the present invention is preferably within a range from 0.8 to 1.0, and is more preferably from 0.9 to 1.0. In those cases where the component (A) is the only component that contains alkenyl groups within the composition of the present invention, the blend amount of the component (C) is sufficient to produce a molar ratio of SiH groups within the component (C) relative to alkenyl groups within the component (A) (namely, SiH groups/alkenyl groups) that is within a range from 0.5 to 20, and preferably from 0.6 to 15.

<Component (D)>

The component (D) is an addition reaction retarder, and is added to the composition to ensure that prior to heat-curing, for example during preparation of the silicone pressure-sensitive adhesive composition, or during application of the pressure-sensitive adhesive composition to a substrate, the treatment liquid containing the pressure-sensitive adhesive composition does not undergo gelling or an increase in viscosity.

Specific examples of the component (D) include:
3-methyl-1-butyn-3-ol,
3-methyl-1-pentyn-3-ol,
3,5-dimethyl-1-hexyn-3-ol,
1-ethynylcyclohexanol,
3-methyl-3-trimethylsiloxy-1-butyne,
3-methyl-3-trimethylsiloxy-1-pentyne,
3,5-dimethyl-3-trimethylsiloxy-1-hexyne,
1-ethynyl-1-trimethylsiloxycyclohexane,
bis(2,2-dimethyl-3-butynoxy)dimethylsilane,
1,3,5,7-tetramethyl-1,3,5,7-tetravinylcyclotetrasiloxane, and
1,1,3,3-tetramethyl-1,3-divinyldisiloxane.

The component (D) may be either a single compound or a combination of two or more compounds.

The blend amount of the component (D) is typically within a range from 0 to 8.0 parts by mass, preferably from 0.05 to 8.0 parts by mass, and more preferably from 0.05 to 2.0 parts by mass, per 100 parts by mass of the combination of the components (A) and (B). If this blend amount exceeds 8.0 parts by mass, then the curability of the resulting composition may deteriorate.

<Component (E)>

The component (E) is a platinum group metal-based catalyst. Examples of this catalyst include platinum-based catalysts such as chloroplatinic acid, alcohol solutions of chloroplatinic acid, reaction products of chloroplatinic acid and an alcohol, reaction products of chloroplatinic acid and an olefin compound, and reaction products of chloroplatinic acid and a vinyl group-containing siloxane, as well as catalysts containing metals such as ruthenium, rhodium, palladium and iridium. A platinum-based catalyst is preferred. The component (E) may be either a single catalyst or a combination of two or more catalysts.

The amount added of the component (E), expressed as the mass of the platinum group metal fraction relative to the combined mass of the components (A) and (B), is typically within a range from 1 to 5,000 ppm, preferably from 5 to 500 ppm, and more preferably from 10 to 200 ppm. If this amount is less than 1 ppm, then the curability of the resulting composition may deteriorate, the cross-linking density within the obtained cured product may fall, and the holding power of the obtained silicone pressure-sensitive adhesive layer may deteriorate, whereas if the amount exceeds 5,000 ppm, then the usable lifespan for the treatment bath may become overly short.

<Component (F)>

The component (F) is an organopolysiloxane comprising $R^3_1SiO_{1.5}$ units and $R^3_2SiO_1$ units (wherein $R^3$ is as defined above), wherein the molar ratio of $R^3_1SiO_{1.5}$ units/$R^3_2SiO_1$ units is within a range from 100/0 to 30/70, and preferably from 100/0 to 50/50. If the molar ratio of $R^3_1SiO_{1.5}$ units/$R^3_2SiO_1$ units is less than 30/70, then the adhesive strength of the resulting silicone pressure-sensitive adhesive layer to silicone rubbers may be unsatisfactory. Specific examples of the $R^3$ groups include the same groups as those listed above, and a methyl group is particularly desirable.

The component (F) may comprise OH groups in the form of siloxane units containing a hydroxyl group bonded to a silicon atom. The amount of these silanol group-containing units is sufficient to produce an OH group content within the component (F) that is preferably not more than 5.0% by mass, and more preferably not more than 3.0% by mass. The lower limit for this OH group content may be any value greater than 0.0% by mass, and for example, may be a value of 0.1% by mass or greater. If the OH group content exceeds 5.0% by mass, then the tack of the resulting silicone pressure-sensitive adhesive layer tends to deteriorate. Examples of the siloxane units containing a hydroxyl group bonded to a silicon atom include $(HO)R^3SiO_1$ units, $(HO)_2R^3SiO_{0.5}$ units and $(HO)R^3{}_2SiO_{0.5}$ units (wherein $R^3$ is as defined above). The component (F) may contain an alkoxy group such as a methoxy group, ethoxy group or isopropoxy group, although the alkoxy group content within the component (F) is preferably not more than 5.0% by mass. If the alkoxy group content exceeds 5.0% by mass, then the tack of the resulting silicone pressure-sensitive adhesive layer tends to deteriorate.

The molecular weight of the component (F) is preferably not less than 2,000, and is more preferably 7,000 or greater. Provided the molecular weight is at least 2,000, the adhesive strength of the obtained silicone pressure-sensitive adhesive layer to silicone rubbers can be effectively improved. This molecular weight refers to a weight average molecular weight determined by gel permeation chromatography (GPC) and referenced against polystyrene standards.

Further, the component (F) may also include one or both of $R^3{}_3SiO_{0.5}$ units (wherein $R^3$ is as defined above) and $SiO_2$ units in amounts that do not impair the properties of the present invention. There are no particular restrictions on the combined amount of the $R^3{}_1SiO_5$ units and the $R^3{}_2SiO_1$ units within the component (F), provided there are no adverse effects on the properties of the present invention, although this combined amount is preferably within a range from 80 to 100 mol %, and more preferably from 90 to 100 mol %, of all the siloxane units that constitute the component (F). The component (F) may be either a single compound or a combination of two or more compounds.

By adding the component (F) to the silicone pressure-sensitive adhesive composition of the present invention, a powerful adhesive strength can be achieved between the silicone pressure-sensitive adhesive layer and the silicone rubber that functions as the adherend. In particular, in those cases where the component (F) contains SiOH groups, these SiOH groups are able to generate intermolecular forces such as hydrogen bonding with the SiOH groups and SiH groups that exist within other components contained within the silicone pressure-sensitive adhesive composition of the present invention, and with the SiOH groups and the like that exist within the silicone rubber of the adherend. Moreover, the SiOH groups within the component (F) are also capable of generating Si—O—Si bonds via condensation reactions. Accordingly, the actions of the component (F) result in the formation of cross-linked structures between the cured product of the silicone pressure-sensitive adhesive composition and the silicone rubber of the adherend, enabling an even more powerful adhesive strength to be achieved between the silicone pressure-sensitive adhesive layer and the silicone rubber.

There are no particular restrictions on the form of the component (F). For example, the component (F) may be used in the form of a lone compound, or may be diluted in an organic solvent such as toluene prior to use.

The blend amount of the component (F) is typically within a range from 1 to 30 parts by mass, and preferably from 2 to 20 parts by mass, per 100 parts by mass of the combination of components (A) and (B). If this blend amount is less than 1 part by mass, then the adhesive strength of the resulting silicone pressure-sensitive adhesive layer to silicone rubbers may be unsatisfactory. On the other hand, if the blend amount exceeds 30 parts by mass, then one or both of the tack and the holding power of the obtained silicone pressure-sensitive adhesive layer may deteriorate.

In order to incorporate the component (F) within the silicone pressure-sensitive adhesive composition of the present invention, usually, the component (F) and the other components need simply be mixed together and then dispersed uniformly. In those cases where the component (A) and the component (B) are subjected to a condensation reaction in advance, the component (F) may be included within this condensation reaction. In such a case, the condensation reaction may be conducted by dissolving the mixture of the components (A), (B) and (F) in a solvent such as toluene, subsequently reacting the mixture using an alkaline catalyst, either at room temperature or under heated reflux conditions, and then performing a neutralization if required. Details concerning the alkaline catalyst, the condensation reaction conditions and the neutralizing agent are the same as those described above.

<Other Optional Components>

Besides the components listed above, other optional components may also be added to the silicone pressure-sensitive adhesive composition of the present invention. Examples of optional components that may be used include unreactive organopolysiloxanes such as polydimethylsiloxanes and polydimethyldiphenylsiloxanes, antioxidants such as phenol-based, quinone-based, amine-based, phosphorus-based, phosphite-based, sulfur-based and thioether-based antioxidants, photostabilizers such as triazole-based and benzophenone-based photostabilizers, flame retardants such as phosphate ester-based, halogen-based, phosphorus-based and antimony-based flame retardants, antistatic agents such as cationic surfactants, anionic surfactants and nonionic surfactants, solvents that may be added to reduce the composition viscosity during coating, including aromatic solvents such as toluene and xylene, aliphatic solvents such as hexane, octane and isoparaffin, ketone-based solvents such as methyl ethyl ketone and methyl isobutyl ketone, ester-based solvents such as ethyl acetate and isobutyl acetate, ether based solvents such as diisopropyl ether and 1,4-dioxane, and mixed solvents thereof, as well as dyes and pigments.

<Method of Producing the Composition>

The composition of the present invention is produced by mixing and dissolving the components (A) to (F), together with any other optional components. The types of solvents described above are particularly useful as optional components.

<Applications of the Composition>

The silicone pressure-sensitive adhesive composition of the present invention produced in the manner described above can be applied to all manner of substrates, and then cured under predetermined conditions to form a silicone pressure-sensitive adhesive layer. For example, the silicone pressure-sensitive adhesive composition of the present invention can be used particularly favorably within a pressure-sensitive adhesive tape comprising a substrate, and a cured product layer consisting of a cured product of the composition of the present invention laminated to at least one surface of the substrate.

Examples of the substrate include plastic films of polyester, polytetrafluoroethylene, polyimide, polyphenylene sulfide, polyamide, polycarbonate, polystyrene, polypropylene, polyethylene or polyvinyl chloride or the like, metal foils such as aluminum foil or copper foil, papers such as Japanese washi paper, synthetic papers or polyethylene-laminated papers, cloth, glass fiber, or composite substrates prepared by laminating at least two of the above substrates.

In order to further improve the adhesion between the substrate and the silicone pressure-sensitive adhesive layer, the substrate may be subjected in advance to a preliminary primer treatment, corona treatment, etching treatment, or plasma treatment or the like.

Application of the pressure-sensitive adhesive composition may be conducted using conventional coating methods. Examples of the coating method include methods that employ a comma coater, lip coater, roll coater, die coater, knife coater, blade coater, rod coater, bar coater, kiss coater or gravure coater, as well as screen coating, dip coating and cast coating methods.

The coating amount may be set appropriately in accordance with the intended application, and is typically an amount that yields a thickness for the silicone pressure-sensitive adhesive layer following curing that is within a range from 2 to 200 μm, and preferably from 3 to 100 μm.

The curing conditions may be set to a temperature within a range from 70 to 250° C. for a period of 10 seconds to 10 minutes, although the conditions are not restricted to these ranges.

A pressure-sensitive adhesive tape of the present invention may be produced by applying the silicone pressure-sensitive adhesive composition of the present invention directly to an aforementioned substrate using a method described above, and then curing the composition to form a silicone pressure-sensitive adhesive layer. Alternatively, the pressure-sensitive adhesive tape may be produced by first applying the composition of the present invention to a release film or release paper with a releasable coating provided on the surface, subsequently curing the composition to form a silicone pressure-sensitive adhesive layer, and then using a transfer method to bond this silicone pressure-sensitive adhesive layer to an aforementioned substrate.

The pressure-sensitive adhesive tape of the present invention may further comprise a release film consisting of a substrate at least one surface of which is coated with a silicone-based release agent containing a fluorine-containing substituent, wherein this release film is laminated to the cured product layer (the silicone pressure-sensitive adhesive layer) so that a release agent-coated surface of the release film contacts the cured product layer (silicone pressure-sensitive adhesive layer). By including this type of release film, the silicone pressure-sensitive adhesive layer can be effectively protected. The release film can be easily peeled from the silicone pressure-sensitive adhesive layer and removed when the pressure-sensitive adhesive tape is used.

Examples of the substrate used within the release film include plastic films such as polyester films. Examples of compounds that may be used as the silicone-based release agent containing a fluorine-containing substituent include the compounds disclosed in JP 5-7434 B and JP 4-76391 B. Specific examples include release film silicone compositions comprising:

(a) an organopolysiloxane containing at least two alkenyl groups bonded to silicon atoms within each molecule, and also containing at least one fluorine-containing substituent bonded to a silicon atom within each molecule, (b) an organohydrogenpolysiloxane containing at least three hydrogen atoms bonded to silicon atoms within each molecule, and (c) a platinum group metal-based catalyst.

Examples of the component (a) include compounds of the formula shown below.

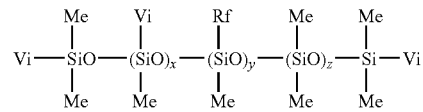

In this formula, Vi represents a vinyl group, Me represents a methyl group, Rf represents a fluorine-containing substituent, x represents an integer of 0 or greater, y represents an integer of 1 or greater, and z represents an integer of 0 or greater, provided that x+y+z is an integer of 50 to 1,000.

Examples of the fluorine-containing substituent Rf within the component (a) include groups represented by formulas (a1) to (a7) shown below.

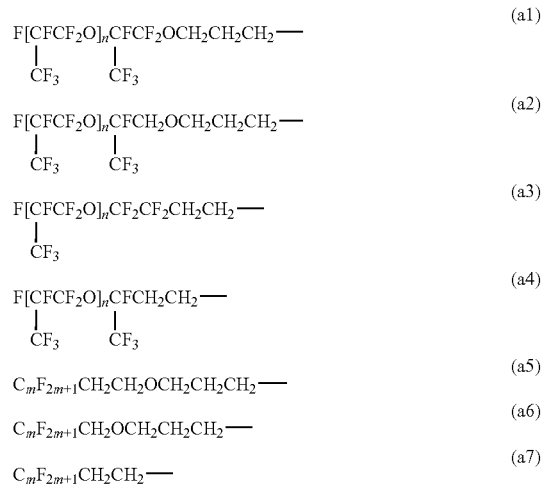

In the above formulas (a1) to (a7), n represents an integer of 1 to 5, and m represents an integer of 1 to 10.

Further, examples of the organohydrogenpolysiloxane of the component (b) include organohydrogenpolysiloxanes represented by formula (4) shown below:

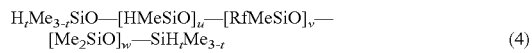

(wherein Rf is as defined above, t is 0 or 1, u and v each represents an integer of 1 or greater, and w represents an integer of 0 or greater, provided that 2t+u≧3 and 2≦u+v+w≦200), and organohydrogenpolysiloxanes represented by formula (3) shown above (wherein f and g satisfy: 1≦f+g≦1,000, and typically satisfy: 1≦f+g≦200). Moreover, examples of the platinum group metal-based catalyst of the component (c) include the same platinum group metal-based catalysts as those listed above for the component (E).

There are no particular restrictions on the types of adhered that can be bonded or affixed using a pressure-sensitive adhesive tape produced using the silicone pressure-sensitive adhesive composition of the present invention, and examples include silicone materials such as silicone rubbers, silicone sealants, silicone potting materials, silicone LIM materials and silicone varnishes; release papers or release films that have been coated with a silicone; metals, plastics, wood materials, cloth or papers that have been coated with a silicone coating material, silicone release agent, silicone water repellent agent, or other coating material containing a silicone; and composite materials formed by combining at least two of these adherends. Of these possibilities, the adhered is preferably a silicone material such as a silicone rubber, silicone sealant or silicone LIM material. In other words, the silicone pressure-sensitive adhesive composition of the present invention can be used for bonding or affixing silicone materials, and is particularly ideal for bonding or affixing silicone rubbers.

EXAMPLES

The present invention is described in more detail below using a series of examples and comparative examples, although the present invention is in no way limited by the examples presented below. In the examples, viscosity values refer to values measured at 25° C., "parts" refer to "parts by mass", and the values reported for the various properties refer to measured values obtained using the test methods described below. Furthermore, Me represents a methyl group and Vi represents a vinyl group.

Each of the compositions prepared in the following examples was measured for peel strength, adhesive strength, adhesive strength to silicone rubber, and holding power, using the measurement methods described below.

[Peel Strength]

Using an applicator, a solution of the silicone pressure-sensitive adhesive composition was applied to a polyester film of thickness 25 μm and width 25 mm, in an amount sufficient to generate a cured layer of thickness 30 μm, and the composition was then cured by heating at 130° C. for 1 minute, thus completing preparation of a pressure-sensitive adhesive tape. This pressure-sensitive adhesive tape was then bonded to the release agent-coated surface of a release film consisting of a substrate coated with a silicone-based release agent containing a fluorine-containing substituent, and compression bonding was then performed by rolling a 2 kg roller coated with a rubber layer once back and forth across the tape. Following standing for either one day at 25° C. or 3 days at 70° C., one end of the pressure-sensitive adhesive tape was detached from the release film and attached to a tensile tester, and the force (N/25 mm) required to peel the tape away from the release film at a peel speed of 300 mm/minute and an angle of 180° was measured using the tensile tester.

The coating of the silicone-based release agent containing a fluorine-containing substituent onto the substrate was performed using a silicone-based release agent containing a fluorine-containing substituent, the release agent consisting of:

(a) 4.74 parts of an organopolysiloxane containing a vinyl group and a fluorine-containing substituent, represented by a formula shown below:

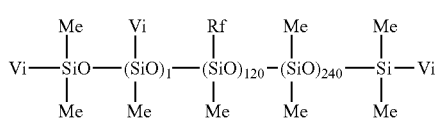

wherein Rf is a fluorine-containing substituent represented by a formula shown below:

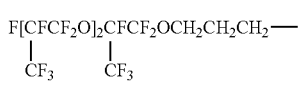

(b) 0.26 parts of an organohydrogenpolysiloxane represented by a formula shown below:

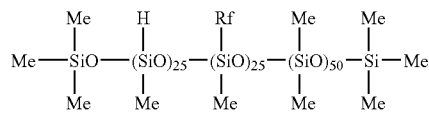

wherein Rf is as defined above, (c) a chloroplatinic acid/vinylsiloxane complex salt, in an amount sufficient to provide a mass of platinum relative to the combined mass of the components (a) and (b) of 30 ppm, (d) 0.03 parts of 3-methyl-1-butyn-3-ol, and (e) 95 parts of a fluorine-containing solvent.

Using a wire bar (No. 7), this composition (solid fraction: 5% by mass) was applied to a substrate consisting of a polyester film of thickness 38 μm in an amount sufficient to generate a coating of approximately 0.5 g/m², and the composition was then heated at 150° C. for 60 seconds, thereby curing the composition and evaporating off the fluorine-containing solvent to complete preparation of the release film.

[Adhesive Strength]

A pressure-sensitive adhesive tape was prepared in the same manner as that described above for the peel strength measurement. This pressure-sensitive adhesive tape was bonded to a polished stainless steel sheet, and compression bonding was then performed by rolling a 2 kg roller coated with a rubber layer once back and forth across the tape. Following standing for approximately 2 hours at 25° C., one end of the pressure-sensitive adhesive tape was detached from the stainless steel sheet and attached to a tensile tester, and the force (N/25 mm) required to peel the tape away from the stainless steel sheet at a peel speed of 300 mm/minute and an angle of 180° was measured using the tensile tester.

[Adhesive Strength to Silicone Rubber]

A pressure-sensitive adhesive tape was prepared in the same manner as that described above for the peel strength measurement. This pressure-sensitive adhesive tape was bonded to a silicone rubber sheet of thickness 2 mm (prepared by curing KE951U (a product name), manufactured by Shin-Etsu Chemical Co., Ltd.), and compression bonding was then performed by rolling a 2 kg roller coated with a rubber layer once back and forth across the tape. Following standing for approximately 2 hours at 25° C., one end of the pressure-sensitive adhesive tape was detached from the silicone rubber sheet and attached to a tensile tester, and the force (N/25 mm) required to peel the tape away from the silicone rubber sheet at a peel speed of 300 mm/minute and an angle of 180° was measured using the tensile tester.

[Holding Power]

A pressure-sensitive adhesive tape was prepared in the same manner as that described above for the peel strength measurement. This pressure-sensitive adhesive tape was bonded to the bottom end of a stainless steel plate using an adhesion surface area of 25×25 mm, a 1 kg weight was suspended from the bottom edge of the pressure-sensitive adhesive tape, and the degree of movement (mm) in the tape following suspension in a vertical state for 1 hour at 150° C. was measured using a microscope.

Synthesis Example 1

A solution consisting of a dimethylpolysiloxane having a viscosity of 48,000 mPa·s when dissolved in toluene to form a solution with a concentration of 30% by mass, having both molecular chain terminals blocked with vinyl groups, and containing vinyl groups within 0.08 mol % of all the siloxane units, represented by the formula shown below (40.0 parts):

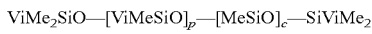
ViMe$_2$SiO—[ViMeSiO]$_p$—[MeSiO]$_c$—SiViMe$_2$ (wherein p and c are numbers that satisfy the above values for the viscosity and the vinyl group content),
a 60% by mass toluene solution of a polysiloxane consisting of Me$_3$SiO$_{0.5}$ units, SiO$_2$ units and silanol group-containing siloxane units (wherein the molar ratio of Me$_3$SiO$_{0.5}$ units/ SiO$_2$ units=0.75, and the silicon atom-bonded hydroxyl group content is 1.5% by mass) (100 parts), toluene (26.7 parts) and ammonia water (0.5 parts) was stirred for 12 hours at room temperature. Subsequently, the solution was heated for 6 hours under reflux at a temperature of approximately 110 to 125° C., and the ammonia and water were removed by evaporation. This procedure caused a condensation reaction to occur. The obtained reaction product was left to cool, and then a methylhydrogenpolysiloxane represented by a formula shown below (0.26 parts):

Me$_3$SiO—[MeHSiO]$_{40}$—SiMe$_3$ and ethynylcyclohexanol (0.2 parts) were added to the reaction product, and sufficient toluene was added to generate a solution with a solid fraction of 60% by mass, thus completing synthesis of a silicone pressure-sensitive adhesive base composition A.

Synthesis Example 2

A solution consisting of a dimethylpolysiloxane having a viscosity of 48,000 mPa·s when dissolved in toluene to form a solution with a concentration of 30% by mass, having both molecular chain terminals blocked with vinyl groups, and containing vinyl groups within 0.08 mol % of all the siloxane units, represented by the formula shown below (14 parts):

ViMe$_2$SiO—[ViMeSiO]$_p$—[MeSiO]$_c$—SiViMe$_2$ (wherein p and c are numbers that satisfy the above values for the viscosity and the vinyl group content),
a dimethylpolysiloxane having a viscosity of 70,000 mPa·s when dissolved in toluene to form a solution with a concentration of 30% by mass, having both molecular chain terminals blocked with OH groups, and containing no alkenyl groups, represented by the formula shown below (26 parts):

(HO)Me$_2$SiO—[MeSiO]$_c$—Si(OH)Me$_2$ (wherein c is a number that satisfies the above viscosity value),
a 60% by mass toluene solution of a polysiloxane consisting of Me$_3$SiO$_{0.5}$ units, SiO$_2$ units and silanol group-containing siloxane units (wherein the molar ratio of Me$_3$SiO$_{0.5}$ units/ SiO$_2$ units=0.75, and the silicon atom-bonded hydroxyl group content is 1.5% by mass) (100 parts), toluene (26.7 parts) and ammonia water (0.5 parts) was stirred for 12 hours at room temperature. Subsequently, the solution was heated for 6 hours under reflux at a temperature of approximately 110 to 125° C., and the ammonia and water were removed by evaporation. This procedure caused a condensation reaction to occur. The obtained reaction product was left to cool, and then a methylhydrogenpolysiloxane represented by a formula shown below (0.090 parts):

Me$_3$SiO—[MeHSiO]$_{40}$—SiMe$_3$ and ethynylcyclohexanol (0.2 parts) were added, and sufficient toluene was added to generate a solution with a solid fraction of 60% by mass, thus completing synthesis of a silicone pressure-sensitive adhesive base composition B.

Example 1

To the silicone pressure-sensitive adhesive base composition A (solid fraction: approximately 60% by mass) (166.7 parts) was added and mixed a component (F) consisting of a 60% by mass toluene solution of an organopolysiloxane consisting of Me$_1$SiO$_{1.5}$ units and Me$_2$SiO$_1$ units (molar ratio of Me$_1$SiO$_{1.5}$ units/Me$_2$SiO$_1$ units=100/0, molecular weight=4,000) (6.7 parts) (equivalent to an amount of the component (F) of 4.0 parts per 100 parts of the combination of components (A) and (B)).

To the resulting mixture (solid fraction: 60% by mass) (100 parts) were added and mixed toluene (50 parts) and a toluene solution of a platinum-vinyl group-containing siloxane complex having a platinum metal content of 0.5% by mass (0.5 parts), thus completing preparation of a silicone pressure-sensitive adhesive composition (solid fraction: approximately 40% by mass).

The peel strength, adhesive strength, adhesive strength to silicone rubber, and holding power for this silicone pressure-sensitive adhesive composition were measured. The results are shown in Table 1.

Example 2

To the silicone pressure-sensitive adhesive base composition B (solid fraction: approximately 60% by mass) (166.7 parts) was added and mixed a component (F) consisting of a 60% by mass toluene solution of an organopolysiloxane consisting of Me$_1$SiO$_{1.5}$ units and Me$_2$SiO$_1$ units (molar ratio of Me$_1$SiO$_{1.5}$ units/Me$_2$SiO$_1$ units=100/0, molecular weight=4,000) (6.7 parts) (equivalent to an amount of the component (F) of 4.0 parts per 100 parts of the combination of components (A) and (B)).

To the resulting mixture (solid fraction: 60% by mass) (100 parts) were added and mixed toluene (50 parts) and a toluene solution of a platinum-vinyl group-containing siloxane complex having a platinum metal content of 0.5% by mass (0.5 parts), thus completing preparation of a silicone pressure-sensitive adhesive composition (solid fraction: approximately 40% by mass).

The peel strength, adhesive strength, adhesive strength to silicone rubber, and holding power for this silicone pressure-sensitive adhesive composition were measured. The results are shown in Table 1.

Example 3

To the silicone pressure-sensitive adhesive base composition B (solid fraction: approximately 60% by mass) (166.7 parts) was added and mixed a component (F) consisting of a 20% by mass toluene solution of an organopolysiloxane consisting of Me$_1$SiO$_{1.5}$ units and Me$_2$SiO$_1$ units (molar ratio of Me$_1$SiO$_{1.5}$ units/Me$_2$SiO$_1$ units=88/12, molecular weight=500,000) (20 parts) (equivalent to an amount of the component (F) of 4.0 parts per 100 parts of the combination of components (A) and (B)).

To the resulting mixture (solid fraction: 56% by mass) (107 parts) were added and mixed toluene (43 parts) and a toluene solution of a platinum-vinyl group-containing siloxane complex having a platinum metal content of 0.5% by mass (0.5 parts), thus completing preparation of a silicone pressure-sensitive adhesive composition (solid fraction: approximately 40% by mass).

The peel strength, adhesive strength, adhesive strength to silicone rubber, and holding power for this silicone pressure-sensitive adhesive composition were measured. The results are shown in Table 1.

Example 4

To the silicone pressure-sensitive adhesive base composition B (solid fraction: approximately 60% by mass) (166.7 parts) was added and mixed a component (F) consisting of a 20% by mass toluene solution of an organopolysiloxane consisting of $Me_1SiO_{1.5}$ units and $Me_2SiO_1$ units (molar ratio of $Me_1SiO_{1.5}$ units/$Me_2SiO_1$ units=88/12, molecular weight=500,000) (80 parts) (equivalent to an amount of the component (F) of 16.0 parts per 100 parts of the combination of components (A) and (B)).

To the resulting mixture (solid fraction: 47% by mass) (128 parts) were added and mixed toluene (22 parts) and a toluene solution of a platinum-vinyl group-containing siloxane complex having a platinum metal content of 0.5% by mass (0.5 parts), thus completing preparation of a silicone pressure-sensitive adhesive composition (solid fraction: approximately 40% by mass).

The peel strength, adhesive strength, adhesive strength to silicone rubber, and holding power for this silicone pressure-sensitive adhesive composition were measured. The results are shown in Table 1.

Example 5

To the silicone pressure-sensitive adhesive base composition B (solid fraction: approximately 60% by mass) (166.7 parts) was added and mixed a component (F) consisting of a 20% by mass toluene solution of an organopolysiloxane consisting of $Me_1SiO_{1.5}$ units and $Me_2SiO_1$ units (molar ratio of $Me_1SiO_{1.5}$ units/$Me_2SiO_1$ units=88/12, molecular weight=500,000) (125 parts) (equivalent to an amount of the component (F) of 25.0 parts per 100 parts of the combination of components (A) and (B)).

To the resulting mixture (solid fraction: 43% by mass) (140 parts) were added and mixed toluene (10 parts) and a toluene solution of a platinum-vinyl group-containing siloxane complex having a platinum metal content of 0.5% by mass (0.5 parts), thus completing preparation of a silicone pressure-sensitive adhesive composition (solid fraction: approximately 40% by mass).

The peel strength, adhesive strength, adhesive strength to silicone rubber, and holding power for this silicone pressure-sensitive adhesive composition were measured. The results are shown in Table 1.

Example 6

To the silicone pressure-sensitive adhesive base composition B (solid fraction: approximately 60% by mass) (166.7 parts) was added and mixed a component (F) consisting of a 20% by mass toluene solution of an organopolysiloxane consisting of $Me_1SiO_{1.5}$ units and $Me_2SiO_1$ units (molar ratio of $Me_1SiO_{1.5}$ units/$Me_2SiO_1$ units=85/15, molecular weight=10,000) (20 parts) (equivalent to an amount of the component (F) of 4.0 parts per 100 parts of the combination of components (A) and (B)).

To the resulting mixture (solid fraction: 56% by mass) (107 parts) were added and mixed toluene (43 parts) and a toluene solution of a platinum-vinyl group-containing siloxane complex having a platinum metal content of 0.5% by mass (0.5 parts), thus completing preparation of a silicone pressure-sensitive adhesive composition (solid fraction: approximately 40% by mass).

The peel strength, adhesive strength, adhesive strength to silicone rubber, and holding power for this silicone pressure-sensitive adhesive composition were measured. The results are shown in Table 1.

Example 7

To the silicone pressure-sensitive adhesive base composition B (solid fraction: approximately 60% by mass) (166.7 parts) was added and mixed a component (F) consisting of a 20% by mass toluene solution of an organopolysiloxane consisting of $Me_1SiO_{1.5}$ units and $Me_2SiO_1$ units (molar ratio of $Me_1SiO_{1.5}$ units/$Me_2SiO_1$ units=69/31, molecular weight=48,000) (20 parts) (equivalent to an amount of the component (F) of 4.0 parts per 100 parts of the combination of components (A) and (B)).

To the resulting mixture (solid fraction: 56% by mass) (107 parts) were added and mixed toluene (43 parts) and a toluene solution of a platinum-vinyl group-containing siloxane complex having a platinum metal content of 0.5% by mass (0.5 parts), thus completing preparation of a silicone pressure-sensitive adhesive composition (solid fraction: approximately 40% by mass).

The peel strength, adhesive strength, adhesive strength to silicone rubber, and holding power for this silicone pressure-sensitive adhesive composition were measured. The results are shown in Table 1.

Example 8

To the silicone pressure-sensitive adhesive base composition B (solid fraction: approximately 60% by mass) (166.7 parts) was added and mixed a component (F) consisting of a 20% by mass toluene solution of an organopolysiloxane consisting of $Me_1SiO_{1.5}$ units and $Me_2SiO_1$ units (molar ratio of $Me_1SiO_5$ units/$Me_2SiO_1$ units=48/52, molecular weight=120,000) (20 parts) (equivalent to an amount of the component (F) of 4.0 parts per 100 parts of the combination of components (A) and (B)).

To the resulting mixture (solid fraction: 56% by mass) (107 parts) were added and mixed toluene (43 parts) and a toluene solution of a platinum-vinyl group-containing siloxane complex having a platinum metal content of 0.5% by mass (0.5 parts), thus completing preparation of a silicone pressure-sensitive adhesive composition (solid fraction: approximately 40% by mass).

The peel strength, adhesive strength, adhesive strength to silicone rubber, and holding power for this silicone pressure-sensitive adhesive composition were measured. The results are shown in Table 1.

Comparative Example 1

To the silicone pressure-sensitive adhesive base composition A (solid fraction: approximately 60% by mass) (100 parts) were added and mixed toluene (50 parts) and a toluene solution of a platinum-vinyl group-containing siloxane complex having a platinum metal content of 0.5% by mass (0.5 parts), thus completing preparation of a silicone pressure-sensitive adhesive composition (solid fraction: approximately 40% by mass).

The peel strength, adhesive strength, adhesive strength to silicone rubber, and holding power for this silicone pressure-sensitive adhesive composition were measured. The results are shown in Table 1.

Comparative Example 2

To the silicone pressure-sensitive adhesive base composition B (solid fraction: approximately 60% by mass) (100 parts) were added and mixed toluene (50 parts) and a toluene solution of a platinum-vinyl group-containing siloxane complex having a platinum metal content of 0.5% by mass (0.5 parts), thus completing preparation of a silicone pressure-sensitive adhesive composition (solid fraction: approximately 40% by mass).

The peel strength, adhesive strength, adhesive strength to silicone rubber, and holding power for this silicone pressure-sensitive adhesive composition were measured. The results are shown in Table 1.

Comparative Example 3

To the silicone pressure-sensitive adhesive base composition B (solid fraction: approximately 60% by mass) (166.7 parts) was added and mixed a 60% by mass toluene solution of a borosiloxane represented by an average composition formula shown below (8.3 parts) (equivalent to 5.0 parts of the borosiloxane per 100 parts of the combination of components (A) and (B)).

$$(Me_2SiO)_{0.8}(i\text{-}C_4H_9SiO_{1.5})_{0.1}(BO_{1.5})_{0.1}$$

To the resulting mixture (solid fraction: 60% by mass) (100 parts) were added and mixed toluene (50 parts) and a toluene solution of a platinum-vinyl group-containing siloxane complex having a platinum metal content of 0.5% by mass (0.5 parts), thus completing preparation of a silicone pressure-sensitive adhesive composition (solid fraction: approximately 40% by mass).

The peel strength, adhesive strength, adhesive strength to silicone rubber, and holding power for this silicone pressure-sensitive adhesive composition were measured. The results are shown in Table 1.

What is claimed is:

1. An addition reaction-curable silicone pressure-sensitive adhesive composition, comprising:
   (A) a diorganopolysiloxane consisting of:
     (A1) a linear diorganopolysiloxane having two or more alkenyl groups within each molecule, and
     (A2) a linear diorganopolysiloxane having SiOH groups at terminals and containing no alkenyl groups,
     wherein
     a mass ratio of (A1)/(A2) is within a range from 100/0 to 10/90,
   in an amount of 20 to 80 parts by mass,
   (B) an organopolysiloxane comprising $R^3_3SiO_{0.5}$ units, $SiO_2$ units, and siloxane units having a hydroxyl group bonded to a silicon atom, wherein
     $R^3$ represents a monovalent hydrocarbon group of 1 to 10 carbon atoms,
     a molar ratio of $R^3_3SiO_{0.5}$ units/$SiO_2$ units is within a range from 0.5 to 0.9, and
     a hydroxyl group content is within a range from 0.1 to 5.0% by mass,
   in an amount of 80 to 20 parts by mass (provided that a combined total of component (A) and component (B) is 100 parts by mass),
   (C) an organohydrogenpolysiloxane comprising three or more SiH groups within each molecule, in an amount such that a molar ratio of SiH groups within component (C) relative to alkenyl groups within the composition is within a range from 0.5 to 20,
   (D) an addition reaction retarder, in an amount within a range from 0 to 8.0 parts by mass per 100 parts by mass of a combination of component (A) and component (B),
   (E) a platinum group metal-based catalyst, in an amount sufficient to provide a mass of the platinum group metal equivalent to 1 to 5,000 ppm relative to a combined mass of component (A) and component (B), and
   (F) an organopolysiloxane comprising $R^3_1SiO_{1.5}$ units and $R^3_2SiO_1$ units, wherein $R^3$ is as defined above, and a molar ratio of $R^3_1SiO_{1.5}$ units/$R^3_2SiO_1$ units is within a range from 100/0 to 30/70,

TABLE 1

|  | Molecular weight | Example 1 | Example 2 | Example 3 | Example 4 | Example 5 | Example 6 | Example 7 | Example 8 | Comparative example 1 | Comparative example 2 | Comparative example 3 |
|---|---|---|---|---|---|---|---|---|---|---|---|---|
| Silicone pressure-sensitive adhesive base composition A |  | 166.7 | — | — | — | — | — | — | — | 166.7 | — | — |
| Silicone pressure-sensitive adhesive base composition B |  | — | 166.7 | 166.7 | 166.7 | 166.7 | 166.7 | 166.7 | 166.7 | — | 166.7 | 166.7 |
| Component (F) $Me_1SiO_{1.5}/Me_2SiO_1 = 100/0$ | 4,000 | 4.0 | 4.0 | — | — | — | — | — | — | — | — | — |
| $Me_1SiO_{1.5}/Me_2SiO_1 = 88/12$ | 500,000 | — | — | 4.0 | 16.0 | 25.0 | — | — | — | — | — | — |
| $Me_1SiO_{1.5}/Me_2SiO_1 = 85/15$ | 10,000 | — | — | — | — | — | 4.0 | — | — | — | — | — |
| $Me_1SiO_{1.5}/Me_2SiO_1 = 69/31$ | 48,000 | — | — | — | — | — | — | 4.0 | — | — | — | — |
| $Me_1SiO_{1.5}/Me_2SiO_1 = 48/52$ | 120,000 | — | — | — | — | — | — | — | 4.0 | — | — | — |
| Borosiloxane |  | — | — | — | — | — | — | — | — | — | — | 5.0 |
| Peel strength (25° C./1 day) (N/25 mm) |  | 0.11 | 0.09 | 0.04 | 0.04 | 0.03 | 0.08 | 0.06 | 0.07 | 0.08 | 0.05 | 0.21 |
| Peel strength (70° C./3 days) (N/25 mm) |  | 0.19 | 0.12 | 0.09 | 0.08 | 0.06 | 0.11 | 0.15 | 0.10 | 0.13 | 0.08 | 0.47 |
| Adhesive strength (N/25 mm) |  | 5.6 | 6.4 | 7.0 | 5.6 | 4.8 | 7.2 | 7.9 | 8.6 | 5.4 | 8.8 | 8.4 |
| Adhesive strength to silicone rubber (N/25 mm) |  | 6.3 | 5.4 | 8.7 | 9.9 | 10.6 | 7.1 | 6.2 | 4.7 | 2.7 | 2.0 | 8.3 |
| Holding power (mm) |  | 0.10 | 0.40 | 0.31 | 0.28 | 0.38 | 0.36 | 0.36 | 0.37 | 0.08 | 0.52 | 1.15 | in an amount within a range from 1 to 30 parts by mass per 100 parts by mass of a combination of component (A) and component (B).

2. The composition according to claim 1, wherein the mass ratio of (A1)/(A2) within component (A) is within a range from 90/10 to 10/90.

3. The composition according to claim 1, wherein
the component (A1) is a linear diorganopolysiloxane represented by formula (1-1) shown below:

$$X_a R^1_{3-a} SiO\text{—}[XR^1SiO]_b\text{—}[R^1_2SiO]_c\text{—}SiX_a R^1_{3-a} \quad (1\text{-}1)$$

wherein $R^1$ represents identical or different monovalent hydrocarbon groups of 1 to 10 carbon atoms that contain no aliphatic unsaturated bonds, X represents identical or different alkenyl groups of 2 to 10 carbon atoms, a represents 0, 1 or 3, b represents an integer of 0 or greater, and c represents an integer of 0 or greater, provided that $2a+b \geq 2$ and $500 \leq b+c \leq 20,000$, a linear diorganopolysiloxane represented by formula (1-2) shown below:

$$(HO)R^1_2(HO)R^1_2SiO\text{—}[XR^1SiO]_{b+2}\text{—}[R^1_2SiO]_c\text{—}Si(OH)R^1_2 \quad (1\text{-}2)$$

wherein $R^1$, X, b and c are as defined above, or
a combination thereof.

4. The composition according to claim 1, wherein
the component (A2) is a linear diorganopolysiloxane represented by formula (2) shown below:

$$R^2_2(HO)SiO\text{-}(R^2_2SiO)_d\text{—}SiR^2_2(OH) \quad (2)$$

wherein $R^2$ represents identical or different monovalent hydrocarbon groups of 1 to 10 carbon atoms that contain no aliphatic unsaturated bonds, and d represents an integer that satisfies $500 \leq d \leq 20,000$.

5. The composition according to claim 1, wherein
the component (C) is an organohydrogenpolysiloxane represented by formula (3) shown below:

$$H_e R^4_{3-e} SiO\text{—}[HR^4SiO]_f\text{—}[R^4_2SiO]_g SiH_e R^4_{3-e} \quad (3)$$

wherein $R^4$ represents identical or different monovalent hydrocarbon groups of 1 to 10 carbon atoms that contain no aliphatic unsaturated bonds, e represents 0 or 1, f represents an integer of 1 or greater, and g represents an integer of 0 or greater, provided that $2e+f \geq 3$ and $1 \leq f+g \leq 1,000$.

6. The composition according to claim 1, wherein a molecular weight of component (F) is not less than 2,000.

7. The composition according to claim 1, wherein the molar ratio of $R^3_1SiO_{1.5}$ units/$R^3_2SiO_1$ units within component (F), wherein $R^3$ is as defined above, is within a range from 100/0 to 50/50.

8. A pressure-sensitive adhesive tape, comprising a substrate, and a cured product layer consisting of a cured product of the composition defined in claim 1 laminated to at least one surface of the substrate.

9. The pressure-sensitive adhesive tape according to claim 8, further comprising a release film consisting of a substrate at least one surface of which is coated with a silicone-based release agent containing a fluorine-containing substituent, wherein the release film is laminated to the cured product layer so that a surface of the release film that is coated with the release agent contacts the cured product layer.

* * * * *